(12) United States Patent
Messinger

(10) Patent No.: US 12,514,597 B2
(45) Date of Patent: Jan. 6, 2026

(54) SYSTEM AND METHODS FOR DECOMPRESSION OF SPINAL EPIDURAL SPACE

(71) Applicant: EPIDUTECH LTD, Nazareth (IL)

(72) Inventor: Daniel Messinger, Migdal HaEmek (IL)

(73) Assignee: EPIDUTECH LTD, Nazareth (IL)

( * ) Notice: Subject to any disclaimer, the term of this patent is extended or adjusted under 35 U.S.C. 154(b) by 0 days.

(21) Appl. No.: 17/432,918

(22) PCT Filed: Feb. 23, 2020

(86) PCT No.: PCT/IB2020/051505
§ 371 (c)(1),
(2) Date: Aug. 21, 2021

(87) PCT Pub. No.: WO2020/174343
PCT Pub. Date: Sep. 3, 2020

(65) Prior Publication Data
US 2022/0211393 A1  Jul. 7, 2022

Related U.S. Application Data

(60) Provisional application No. 62/810,765, filed on Feb. 26, 2019.

(51) Int. Cl.
*A61B 17/16* (2006.01)
*A61B 5/06* (2006.01)
(Continued)

(52) U.S. Cl.
CPC .......... *A61B 17/1671* (2013.01); *A61B 5/062* (2013.01); *A61B 17/1615* (2013.01); *A61B 17/1631* (2013.01); *A61B 34/10* (2016.02); *A61B 34/20* (2016.02); *A61B 2017/00309* (2013.01); *A61B 2017/00314* (2013.01);
(Continued)

(58) Field of Classification Search
CPC . A61B 5/062; A61B 17/1615; A61B 17/1631; A61B 17/1671; A61B 34/10; A61B 34/20; A61B 2017/00309; A61B 2017/00314; A61B 2017/00323; A61B 2034/105; A61B 2217/005
See application file for complete search history.

(56) References Cited

U.S. PATENT DOCUMENTS 5,921,956 A * 7/1999 Grinberg .......... A61B 17/32002
604/95.01
9,204,891 B2  12/2015 Weitzman
(Continued)

FOREIGN PATENT DOCUMENTS

| EP | 1 017 323 | 7/2000 |
|----|-----------|--------|
| WO | 1999/15090 | 4/1999 |
| WO | 2019/006087 | 1/2019 |

*Primary Examiner* — Joseph A Stoklosa
*Assistant Examiner* — Annie L Shoulders
(74) *Attorney, Agent, or Firm* — The Roy Gross Law Firm, LLC; Roy D. Gross

(57) ABSTRACT

A surgical tool for removing tissue from a body organ which includes an axially extending outer shell and an axially extending actuator. The outer shell includes a steerable region and the actuator is arranged to flex and extend the steerable region about at least two axes that are transverse to each other.

7 Claims, 13 Drawing Sheets

(51) Int. Cl.
  *A61B 17/00* (2006.01)
  *A61B 34/10* (2016.01)
  *A61B 34/20* (2016.01)

(52) U.S. Cl.
  CPC ............ *A61B 2017/00323* (2013.01); *A61B 2034/105* (2016.02); *A61B 2217/005* (2013.01)

(56) References Cited

U.S. PATENT DOCUMENTS

| | | |
|---|---|---|
| 9,439,634 B2 | 9/2016 | Ries et al. |
| 10,154,834 B2 | 12/2018 | Ries et al. |
| 10,226,357 B2 | 3/2019 | Ries |
| 10,307,180 B2 | 6/2019 | Weitzman |
| 2005/0216018 A1 | 9/2005 | Sennett |
| 2010/0094116 A1 | 4/2010 | Silverstein |
| 2010/0160735 A1* | 6/2010 | Bakos ................ A61B 17/3417 600/141 |
| 2011/0004157 A1 | 1/2011 | Dewaele et al. |
| 2011/0295108 A1 | 12/2011 | Cox et al. |
| 2011/0295242 A1 | 12/2011 | Spivey et al. |
| 2012/0071759 A1 | 3/2012 | Hagy et al. |
| 2014/0257080 A1 | 9/2014 | Dunbar et al. |
| 2016/0100860 A1* | 4/2016 | Lenker ............... A61B 17/3478 604/95.01 |
| 2016/0235474 A1 | 8/2016 | Prisco et al. |
| 2016/0345947 A1* | 12/2016 | Salahieh .......... A61B 17/00234 |
| 2017/0027608 A1 | 2/2017 | Papadimitrakopoulos et al. |
| 2017/0056979 A1* | 3/2017 | Krause ..................... F16C 1/06 |
| 2017/0173303 A1 | 6/2017 | Salahieh et al. |
| 2017/0333052 A1* | 11/2017 | Ding ................. A61B 17/1666 |
| 2018/0310955 A1 | 11/2018 | Lindekugel et al. |
| 2018/0333165 A1* | 11/2018 | Algawi ............ A61B 17/32002 |
| 2019/0351180 A1* | 11/2019 | Ryu ........................ G01L 1/246 |
| 2020/0008827 A1* | 1/2020 | Dearden ................ A61B 17/29 |
| 2021/0378648 A1* | 12/2021 | Thissen ............ A61B 17/00234 |

* cited by examiner

SYSTEM AND METHODS FOR DECOMPRESSION OF SPINAL EPIDURAL SPACE

TECHNICAL FIELD

Embodiments of the invention relate to surgical methods, and more particularly to systems methods of spine surgery in and around the epidural space.

BACKGROUND

Minimal invasive surgery generally limits the size and number of cuts required for performing the surgical procedure. Such procedure may be performed using an endoscopic or similar type device that is inserted into the body through an incision in the patient's skin (or the like).

Minimal invasive surgery normally utilizes remote manipulation of the inserted tools for performing required actions during a surgical procedure, including removing tissue from bodily structures, such as skeletal structures. In certain cases, the region where removal of tissue may be required can be difficult to access.

Lumbar spine stenosis is a condition where narrowing of spaces within the spine occur, which inflict pressure on nerves that pass through the spine. This may be treated by removing tissue from within the spinal (or epidural) canal (also called neuroforamen). Accessing the epidural space for treating stenosis via the sacral hiatus is a true minimally invasive and beneficial approach that allows reach to most of the lumbar spine but carries inherent challenges.

These challenges may be exemplified by limited space available for instrumentation, poor visualization due to epidural space contents (nerves, thecal sac, epidural fat, epidural blood vessels, spinal ligaments and bone) that may result in surgical instruments being squeezed e.g. against contents of the epidural space.

SUMMARY

The following embodiments and aspects thereof are described and illustrated in conjunction with systems, tools and methods which are meant to be exemplary and illustrative, not limiting in scope.

An aspect of the present invention relates to surgical systems and methods, and more particularly to methods of epidural surgery in and around the epidural space.

At least certain embodiments may be directed to provision of a navigable device with a steerable, controlled shape that may include an ability to cut bone, intervertebral disc material and spinal ligaments.

At least certain embodiments, may in addition include a debris clearing mechanism that may be used in order to facilitate spinal decompression surgery.

In at least certain cases, such navigable devices may be used for other surgical fields other than the lumbar spine, such as thoracic or cervical spine, and hence not necessarily limited to the spine.

Surgical procedures coming within the scope of at least certain embodiments of the present invention may include at least some of the following steps.

A first possible step may include patient positioning and preparation, in which preoperative intravenous antibiotics may be administered for the purpose of preventing infection. A patient may be positioned prone or lateral decubitus on a surgical table. Patient's position may be adjusted with a frame, pillow (or the like) at the abdomen in order to substantially reduce lumbar flexion. A region around the sacral hiatus may be scrubbed and disinfected with aseptic technique, and draping may be provided around the surgical field with local anesthesia administered in the region to be operated.

In at least certain embodiments, an additional possible step may include patient navigational registration. This may be accomplished by studying body structures to be operated, e.g. by fluoroscopy in order to visualize lumbar osseous architecture. In an embodiment, fluoroscopic images may be registered to a tracking system, such as in one example an Electromagnetic Tracking System (EMTS) and preoperative imaging studies (Computerized Tomography (CT), Magnetic Resonance Imaging (MRI) or both.

A further step may include insertion of a surgical device according to various embodiments of the present invention into the spinal canal. In certain cases, such insertion may be under tracking guidance (e.g. under EMTS guidance). Prior to insertion of the surgical device, at least some of the following may be performed.

A spinal needle may be inserted into the sacral hiatus through the epidural space, and a guide wire may be inserted through the needle. While keeping the guide wire in position, the spinal needle may be carefully removed, while forming a small incision, for example about 0.5 cm in width, within the patient's skin over the guide wire with a scalpel. A "home-base" component may be inserted over the guidewire and attached firmly to the sacral canal.

A surgical device according to various embodiments of the present invention may be inserted, possibly through the "home-base" component (or any other suitable entry forming device) to be advanced through the epidural space. In certain embodiments, such advancement may be under tracking guidance (e.g. EMTS guidance, real time MRI or the like).

The surgical device may be advanced anterior to the thecal sac which is adjacent the vertebral bodies and intervertebral discs, or posterior to the thecal sac, i.e., against the laminae and ligamentum flavum, according to surgeon's preference or the pathology treated.

In at least certain embodiments, certain surgical tools may be arranged to assisting in alleviating spinal decompression—i.e. a surgical procedure intended to relieve pressure on the spinal cord or on one or more compressed nerve roots passing through or exiting the spinal column. Other surgical tool embodiments may be suitable for other type surgical procedures, such as discectomy where whole or partial removal of an intervertebral disc may take place. Such surgical tool embodiments may include a relative non-flexible proximal shaft leading up to a steerable flexible region as disclosed herein, when such steering may include bending the steerable region about two non-parallel axes.

In a first possible step, upon reaching a desired location of spinal pathology an embodiment of a surgical tool of the present invention may be steered to position the cutting head of the device against a pressure producing pathology. The cutting head may be arranged to move, e.g. rotate, possibly by an external motor to thus allow the degradation of the pathology.

The cutting head according to various embodiments of the present invention, may be one or more of mechanical drill, shaver, cutter (or the like). In at least certain embodiments, a debris removal system may be comprised in the surgical tool to remove e.g. osseous, ligamentous and intervertebral disc debris materials (etc.) and unwanted fluids from the spinal canal. Such debris removal system may utilize suction for debris removal and/or may urge debris removal by flushing fluid through the device to flush debris.

In at least certain embodiments, the surgical tool's cutting head may be hollow to allow retrograde debris evacuation into an inner tube of the surgical tool. In certain cases, such inner tube if clogged up with debris, may be removed in its entirety for being cleaned, and then possibly reinserted back into the surgical tool—with said removal and re-introduction of the inner tube possibly taking place while the outer shaft of the cutting tool remains within the body, e.g. within the epidural space.

Upon completion of decompression of neural elements, possibly in one or more of anterior and/or posterior regions of the spinal cord thecal sac, the surgical tool may be retrieved and the surgical wound sutured and dressed.

In at least certain embodiments, the surgical tool may: comprise of one or more flexible regions, guided by control members, in one example embodied as wire members. Such control members may control curvature of an extension of the surgical tool about one or more axes.

A surgical tool according to at least some embodiments may be arranged to include an assembly of one or more of the following elements: an outer shell, an actuator, a partition and an inner tool. In at least certain embodiments, at least some of the assembly elements may follow a substantially tube shape.

The inner tool may be comprised of one or more flexible regions and may be urged to rotate by an external motor via a control unit. The inner tool may be arranged to include a cutting head at its distal region.

The surgical tool may be arranged to include flexibility for facilitating its maneuvering through the epidural space, while being controlled by a surgeon to flex at its various flexible regions via the surgical tool's actuator. The actuator may be arranged include push-pull wire like members for affecting changes in curvature of the surgical tool.

In certain embodiments, the actuator may be substantially separated from direct engagement with the rotating inner tool by the partition. The partition may be arranged to include flexible regions that overlay and generally axially align in the assembled surgical tool, with corresponding flexible regions of the inner tool. Preferably, the actuator may be flexibly bendable, while remaining substantially stiff to resist extension or shortening along its axial extension.

Thus, by attaching via the wire like members to the flexible regions of the partition, the actuator can transfer via the partition movements to the inner tool to urge it to also flex at its flexible regions.

Such flexing of the inner tool may include also flexing a region of the inner tool including its cutting head and consequently flexing a tip region of the surgical tool. The outer shell may be located at an outer most periphery of the surgical tool, and thus may be generally formed about the actuator, partition and inner tool.

An aspect of the present invention may include surgical navigation of the surgical tool. This may be accomplished by a registration stage including patient imaging, possibly resulting in a three dimensional (3D) computerized model of the epidural space that may be reconstructed from data Obtained from e.g. CT or MRI examination of the patient, i.e. data registration.

In certain embodiments, image analysis may include segmentation by tissue type, highlighting of nervous tissue, epidural blood vessels, bony architecture, etc. The 3D computerized model may in some cases be available prior to the surgical operation and analyzed by the surgeon to produce a pre-operative surgical plan that include areas of the spinal canal that may be removed to allow neural tissue decompression.

In at least certain embodiments, patient post-positional registration may is be performed by direct fluoroscopy in order to visualize lumbar osseous architecture and register spine positioning to patient's 3D pre-operative computerized model and the Electromagnetic Tracking System (EMTS). The registration phase may define the surgery's starting point regarding real world orientation.

In at least certain embodiment's, a magnetic sensor, possibly in form of an array of sensors, may be provided for registration/tracking a location of the surgical tool relative along the spinal canal. The magnetic sensor may be placed along the patient's spine on patient's back, while possibly being registered fluoroscopically.

In at least certain embodiments, a magnetic member may be attached to a distal end of the surgical tool so that the position of the surgical tool may be monitored by the sensor. Monitoring e.g. the surgical tip's location, enables substantial precise electromagnetic tracking of the surgical tool during the surgical procedure.

Coupling such tracking with computerized model data registration of the spine, may in certain embodiment enable generally precise navigation of the surgical tool to a desired location.

In certain cases, two or three-dimensional processed data may be displayed on a screen to the surgeon. Such display may comprise provision of essential cross section e.g. defined according to the surgeon's preference. Such cross section(s) may be any one of: coronal, axial and/or sagittal cross section(s). The surgical tool's point of interaction with the patient's anatomy may be shown over the imagery of the processed data (e.g. 3D computerized model). Computer vision techniques may be used in certain cases for altering the surgeon's point of view in various positions and orientations as needed, with an option of implementing by augmented reality the surgical tool over the scene.

This may allow the surgeon to choose a better viewing perspective when needed for diagnostics, intervention or the like. In certain cases, real time safety mode may include utilizing data from EMTS, patient's 3D computerized model and the surgical tool's positional control unit to allow for computerized monitoring of surgical tool's cutting head's orientation in respect to the neural elements.

In certain embodiment's, rotation of the surgical tool about its axis may be monitored e.g. by an accelerometer that may be used for measuring angular orientation of the surgical tool in relation to a coordinate system and/or to a 3D computerized model e.g. obtained by CT. Such monitoring of rotational orientation may be useful in assisting in steering/guiding the tool within e.g. the spinal canal.

This may be useful e.g. in mitigating potential damage from vital organs or tissue being inflicted by the tool's cutting head, such as nerves, the thecal sac (or the like). Upon detection that the cutting head is about to face a vital organ or tissue—a warning signal may be activated and optionally the motor powering rotation of the inner tool and its cutting head may be automatically stopped. Such safety precaution may assist a surgeon in avoiding disorientation and un-intended nervous injury.

In certain embodiments, relative thin flexible instrument(s) may be provided in miniaturized form to allow insertion through the surgical tool in order to achieve removal of bone, intervertebral disc material, ligaments, tumors, etc. Such instruments may: include, but are not limited to:

Electrocautery (an electric cautery system to coagulate blood vessels and vaporize soft tissues).

Drill (mechanical or electrical drill to drill through bone tissue).

Shaver (mechanical or electrical shaver that turns and bites at soft tissues such as intervertebral disc material and ligaments—where such shaver may comprise a cover that protects nearby tissues from accidental injury).

Periosteal strippers (a blunt instrument used for blunt dissection of soft tissues, and helpful in separating adhesions and scars).

Optic fiber (an optic fiber may replace the cutting head to allow direct visualization of the epidural content, including scars, nerves and the degree of decompression).

Robotic assistance (for robotic assisted surgery, where a surgeon may plan the surgery based on a preoperative 3D computerized model with an emphasis on osseous/ligamentous work needed to decompress the neural elements. Following e.g. Fluoroscopy-EDITS registration, the surgeon may advance the surgical tool through the epidural space at which point the robotic system may engaged by the surgeon to perform the pre-planned surgery over several spinal levels.

The robotic system may comprise a controlled motor for maneuvering the surgical tool, and a unit to manipulate the surgical tool's cutting head with unit instruments possibly external to the surgical tool. Such robotic powered system may be configured to operate according to an algorithm that locates the cutting tool by EMTS, CT or MRI registration, or any other suitable method, and controls operation of the motor. Following robotic decompression, the surgeon can perform free hand decompression or evaluate the decompression achieved by using intra-operative CT or MRI.

Such robotic assisted system may reduce surgery time and/or improve decompression accuracy, thereby improving patient safety and results.

Further aspects of the present invention are exemplified in the following:
1. A variable rigidity motorized controllable navigable surgical tool having a catheter type structure with a distally-located magnetic tip and a cutting head.
2. The surgical tool according to aspect 1, wherein a distal cutting head is partially exposed in a certain distal area, to prevent areas that remain covered damage to surrounding tissues.
3. The surgical tool of previous aspects where the cutting head can be removed out of the exterior tube to allow cleaning of debris, much like ramrod, and/or replacement of the cutting head by a different instrument.
4. A magnetic sensor array attached to patient's back for enabling mapping of a surgical tool's magnetic tip, and hence navigation of such tool/tip precisely and safely to a desired location.
5. A surgical tool according to any one of aspects 1 through 3, wherein a curvature of the surgical tool along at least some locations of its axial extension can be controlled (possibly mechanically controlled) by means of push-pull wire like members and/or mechanisms of knobs or electro-mechanics.
6. A surgical tool according to any one of aspects 1 through 3 and being arranged for variable rigidity control to allow improved contact pressure of the cutting head.
7. A surgical tool cutting head's monitoring system for reducing risk of inadvertent nervous injury by possibly triggering disengagement of operation of the surgical tool's cutting action in an event of risk.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
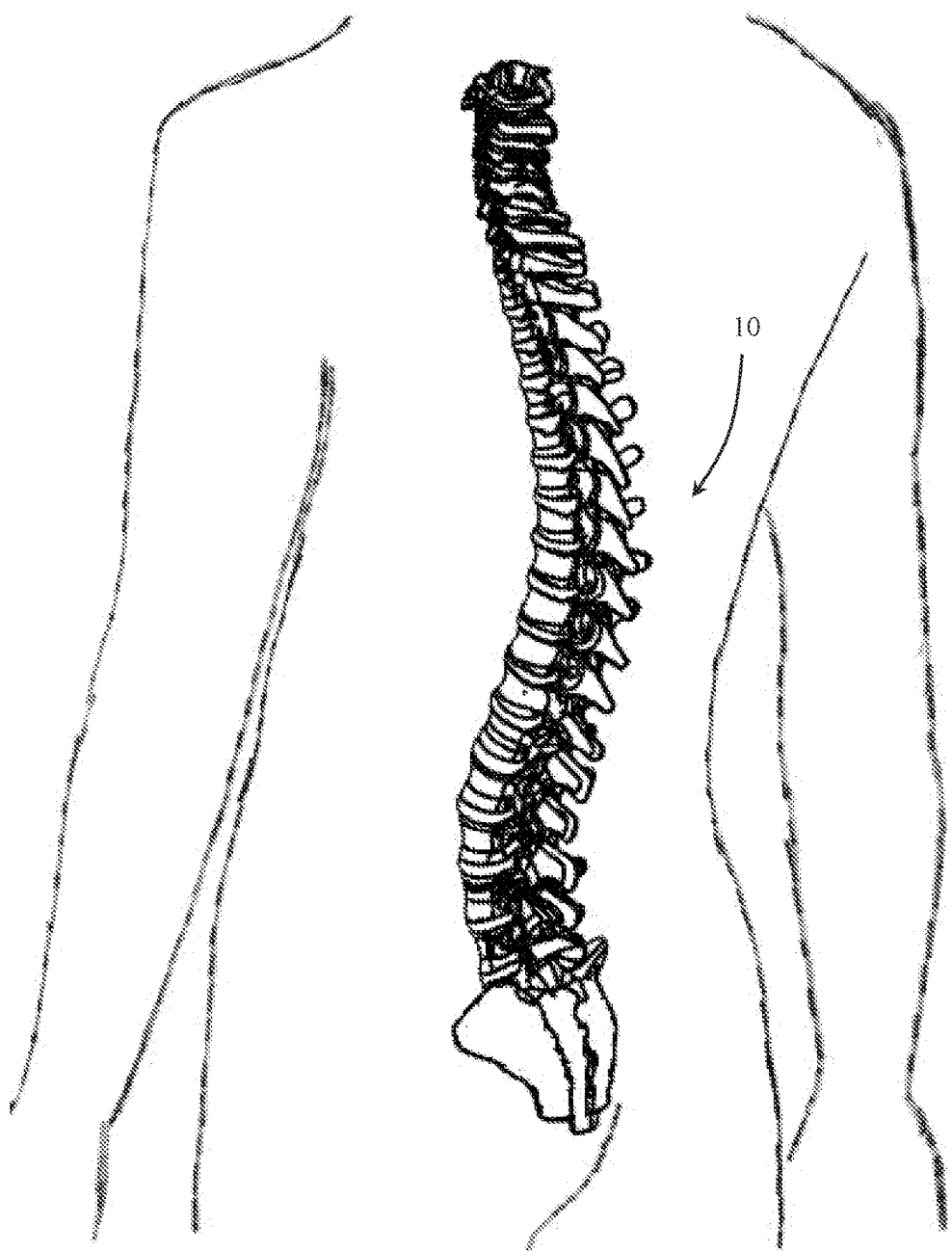
FIG. 1 schematically shows a human spinal cord.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
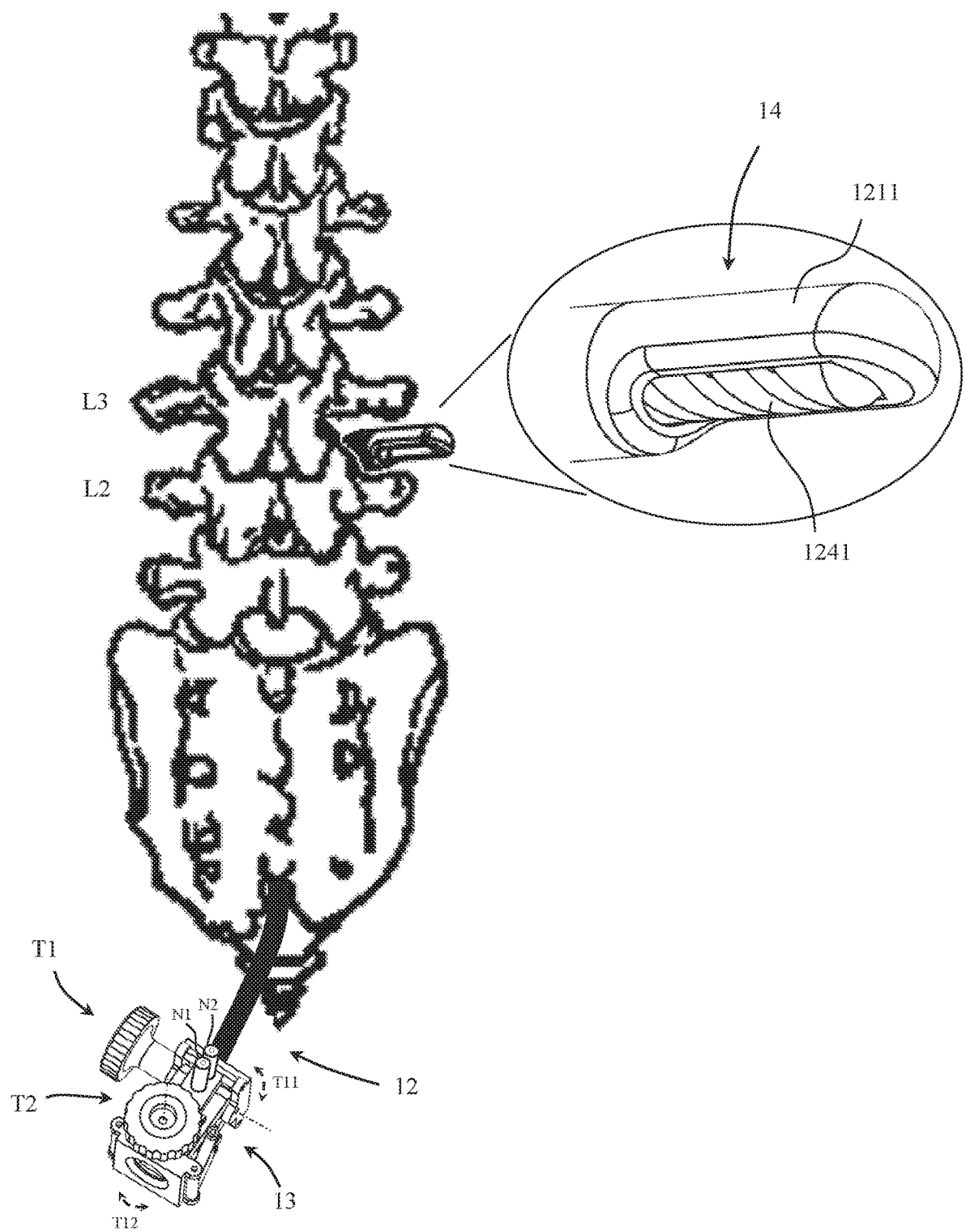
FIG. 2 schematically shows a section of a lumbar curve of the human spine and a surgical device in accordance with an embodiment of the present invention located within a spinal canal of the lumbar curve.

Attention is first drawn to FIG. 1 illustrating a human spine. FIG. 2 shows a lumbar curve of the human spine and a surgical device 12 in accordance with an embodiment of the present invention located within a spinal canal of the lumbar curve. The surgical device may be arranged to include a base member 13 in this example formed as a manipulator at its proximal side for assisting in controlling/manipulating an actuator of the device (an embodiment of such actuator being described in detail further below).

The base member 13 in this example may be formed with two toggles T1, T2, each arranged to interact with a respective pair of rod members of the actuator (see 1221, 1222—described e.g. with respect to FIG. 5 below). Each one of the toggles in this example is arranged to pivot about a respective axis to urge a "swing" like actions (T11, T12) that can transmit push-pull movements to the rod members attached thereto. Base member 13 in this example is also shown formed with an optional pair of nozzles N1, N2 for assisting in debris removal that will be described in more detail herein below with respect e.g. to FIG. 7.

A distal cutting head 14 of the surgical device in this example is seen guided to a location between vertebrae bones L2 and L3 of the lumbar curve. Cutting head includes cutting blades 1241 and a shield 1211 defining a sector through which the cutting blades remain exposed for performing a cutting operation.

Figure 3:
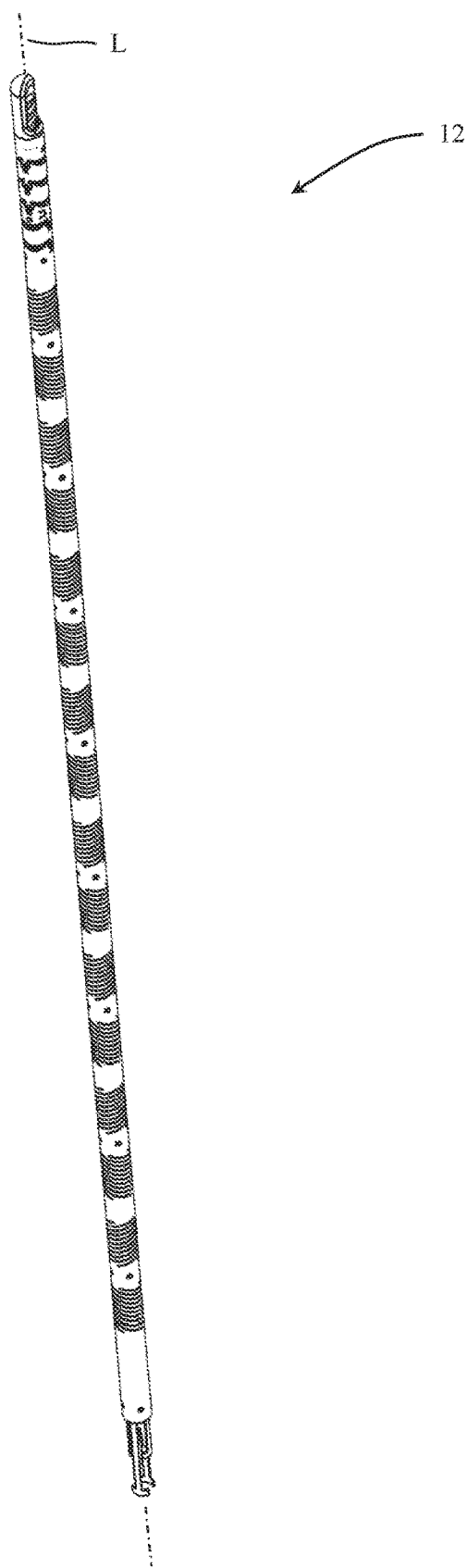
FIG. 3 schematically shows an embodiment of a surgical device in accordance with the present invention.
Figure 4:
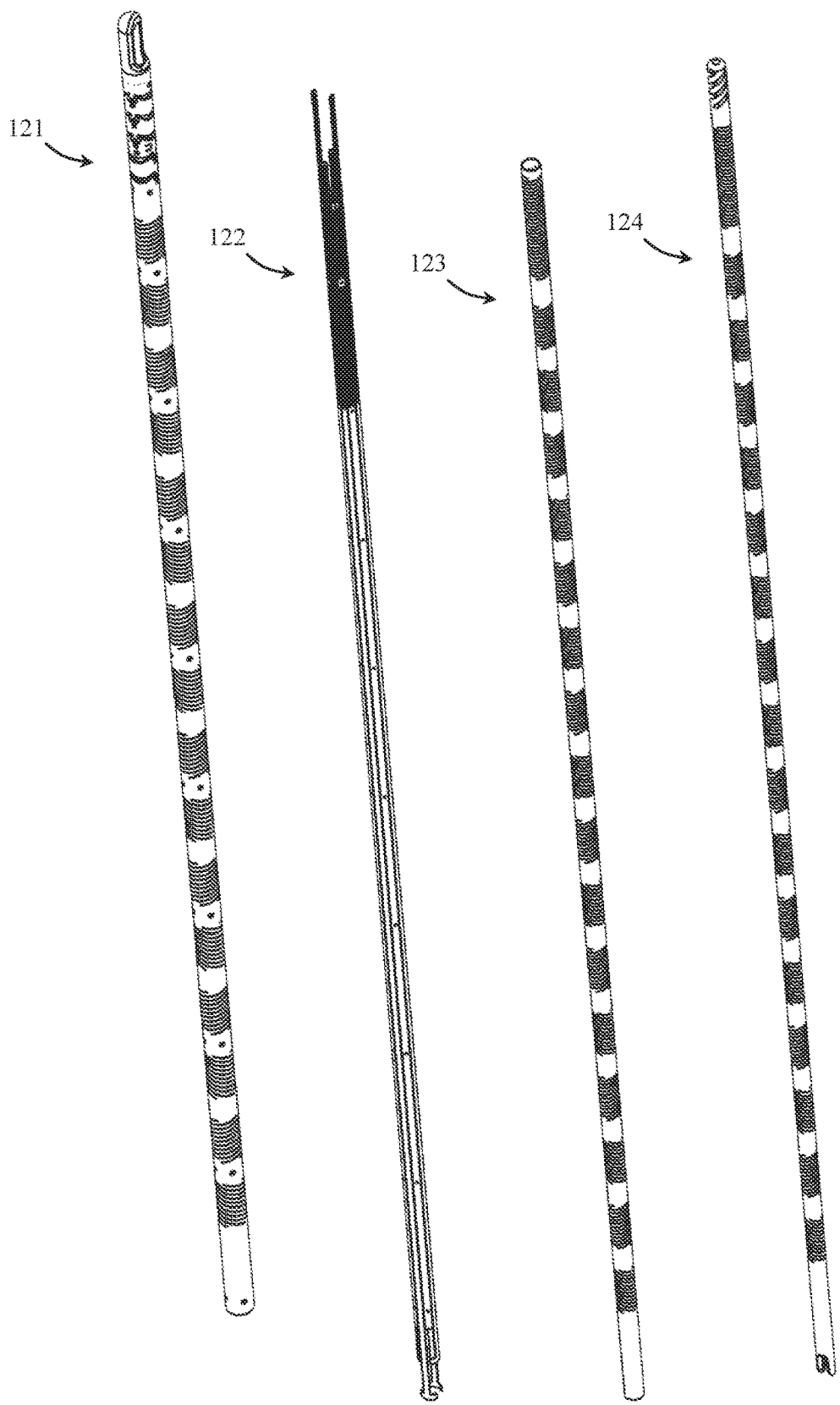
FIG. 4 schematically shows an exploded view of the surgical device of FIG. 3.

Attention is drawn to FIGS. 3 and 4 illustrating an embodiment of a surgical tool 12 in, respectively, assembled and exploded states. Surgical tool 12 has a longitudinal axis L and can be urged to assume various curvatures along its extension to assist its passage through the spinal canal.

Surgical tool 12 in this embodiment can be seen including the following parts: an outer shell 121, an actuator 122, a partition 123 and an inner tool 124. FIGS. 5A to 5D provide detailed views of the various parts forming surgical tool 12, while it is noted that all these parts will be described with respect to the longitudinal axis L of the surgical tool, and hence in their assembled orientation within the tool.

Figure 5A:
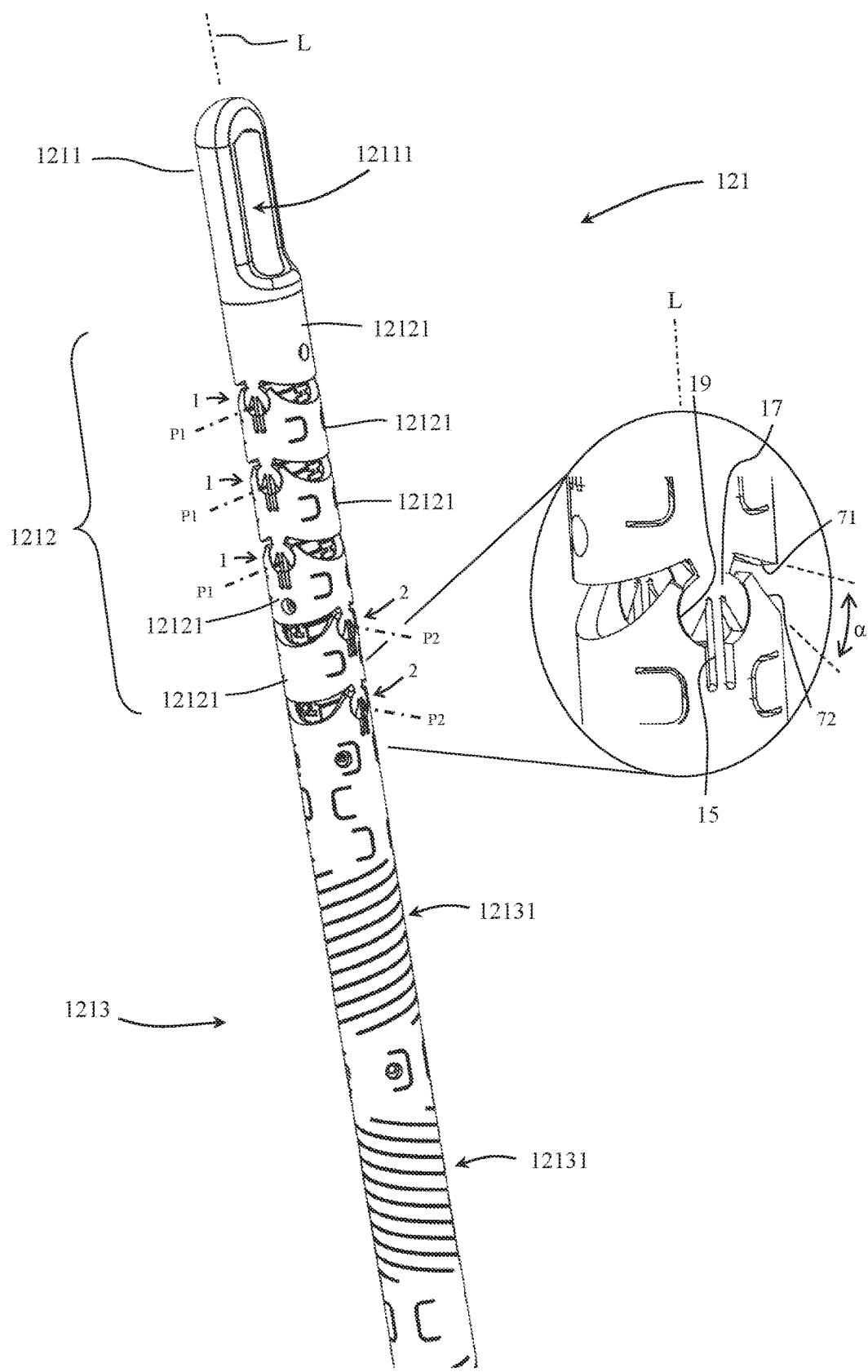
FIG. 5A schematically shows an enlarged section of an outer shell of the surgical device.

Attention is drawn to FIG. 5A providing an enlarged view of a distal portion of outer shell 121. Shield 1211 is located here at the distal tip of outer shell and is arranged to include an axially extending opening 12111 that faces sideways away from axis L. In certain embodiments, shield 1211 may be formed from, or may be arranged to include, magnetic material to assist in tracking of the surgical tool during in use.

Outer shell 121 in this example includes a steerable region 1212 that includes several joints 12121, and shield 1211 is here shown being attached to the distal most joint. The joints 12121 in this example are shown interconnected by first 1 and second 2 pairs of hinge joint types. In FIG. 5A only one of the hinge joints of each pair can be fully viewed.

Each hinge joint 1 of the first type allows adjacent joints 1212 that it interconnects to flex and extend about a first axis P1 thereof, and each hinge joint 2 of the second type allows adjacent joints 1212 that it interconnects to flex and extend about a second axis P2 thereof that is generally orthogonal to the first axis P1.

Each one of the hinge joints 1, 2 in this example can be seen in the enlarged section at the right-hand side of the figure, being arranged to include a bearing member 17 positively engaged within a socket member 19. The socket member 19 may be integral with one of the joints (here a proximal joint) that is being hinged, and the bearing member 17 may be integral with the other joint (here a distal joint) being hinged, while as here seen also optionally remaining integrally joined also to the proximal joint via a flexible linking arm 15.

Facing ends 71, 72 of adjacent joints being hinged may be suitably cut in order to define a maximal angle 'α' that said joints may be pivoted one relative to the other about their respective first or second axes Y1, Y2—from a non-pivoted state and/or a straight section of axis L. In one example, angle 'α' may be about 30 degrees, however other values may be suitably chosen.

Outer shell 121 includes a shank region 1213 that extends in a proximal direction away from steerable region 1212 to a proximal end of the outer shell. Shank region 1213 may include axially spaced apart flexible regions 12131 in this example formed as helical cuts through the outer shell. At least some of the flexible regions 12131 may be formed having opposing right-hand and left-hand helical paths to assist in resisting twisting of the outer shell about axis L during use. The flexible regions 12131 are arranged to allow the shank region to assume curvatures along its axial extension to assist in its passage through the spiral canal.

Figure 5B:
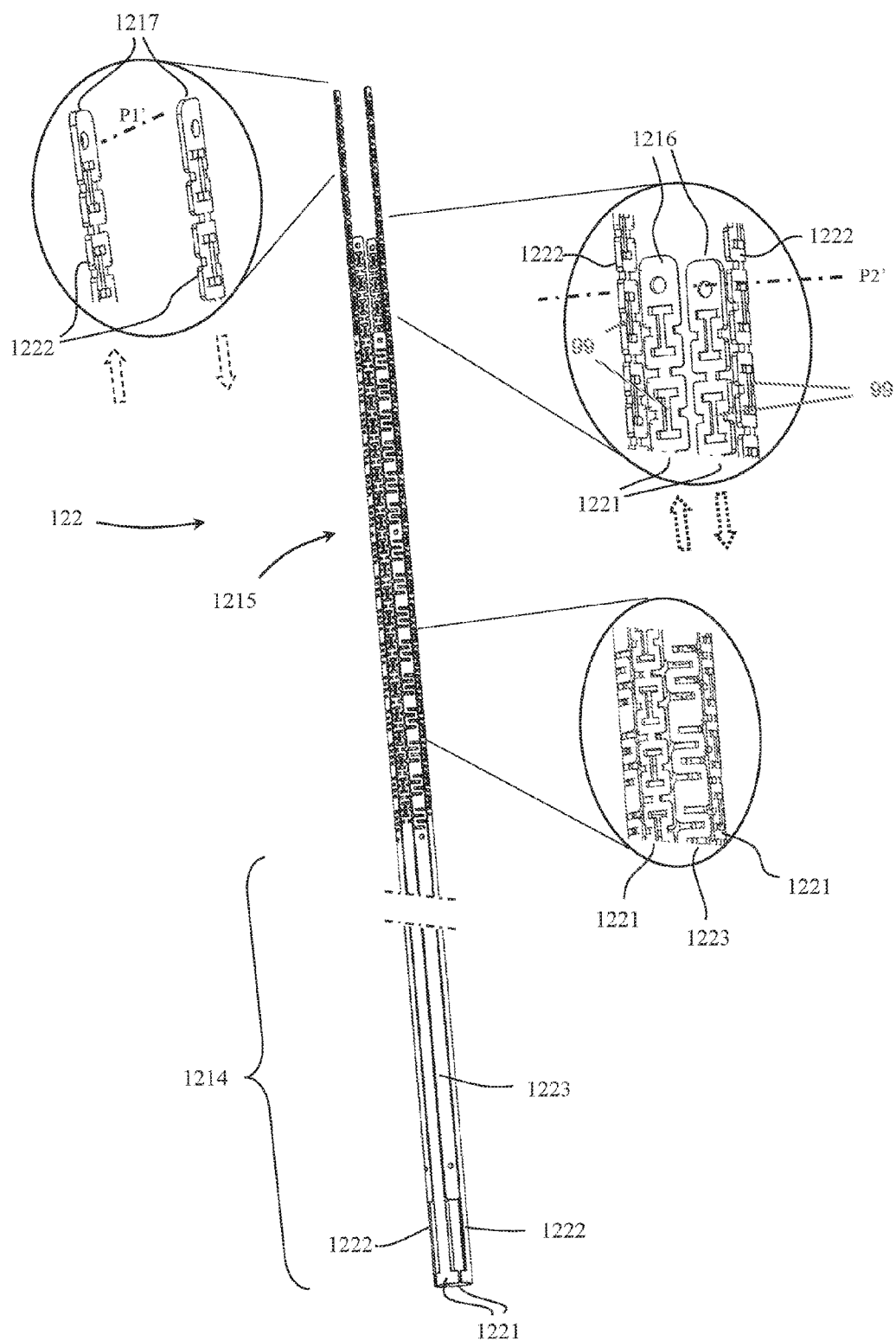
FIG. 5B schematically shows enlarged views of an actuator of the surgical device.

Attention is drawn to FIG. 5B. Actuator 122 includes in this example a first pair of axially extending opposing rod (or wire like) members 1221 and a second pair of axially extending opposing rod (or wire like) members 1222. Thus, rod members in each pair are rotated by about 180 degrees one relative to the other about the actuator's axis. Each respective pair of rod members in this example may be designed to function in push-pull relationship, so that when pulling one rod member of a given pair, the other rod member of said given pair may be pushed to assist in intended actuation (and visa-versa).

Actuator 122 in addition includes four axially extending rails 1223, where each such rail 1223 is located in-between adjacent rod members 1221, 1222 of different pairs. Each one of the rod members and rails, in this example, extends generally un-interrupted along a proximal region 1214 of the actuator. In a distal region 1215 of the actuator, in this example substantially shorter than the proximal region, each one of the rod members and rails may be imparted with flexibility by extending axially with meandering bellow-like interruptions 99.

Each one of the rod members 1221 of the first pair may be arranged to extend up to and terminate at a respective first anchoring region 1216, while each Iii one of the rod members 1222 of the second pair may be arranged to extend up to and terminate at a respective second anchoring region 1217. In this example the anchoring regions 1217 of the second pair of rods 1222 are arranged to be distal to the anchoring regions 1217 of the first pair of rods 1221.

Figure 5C:
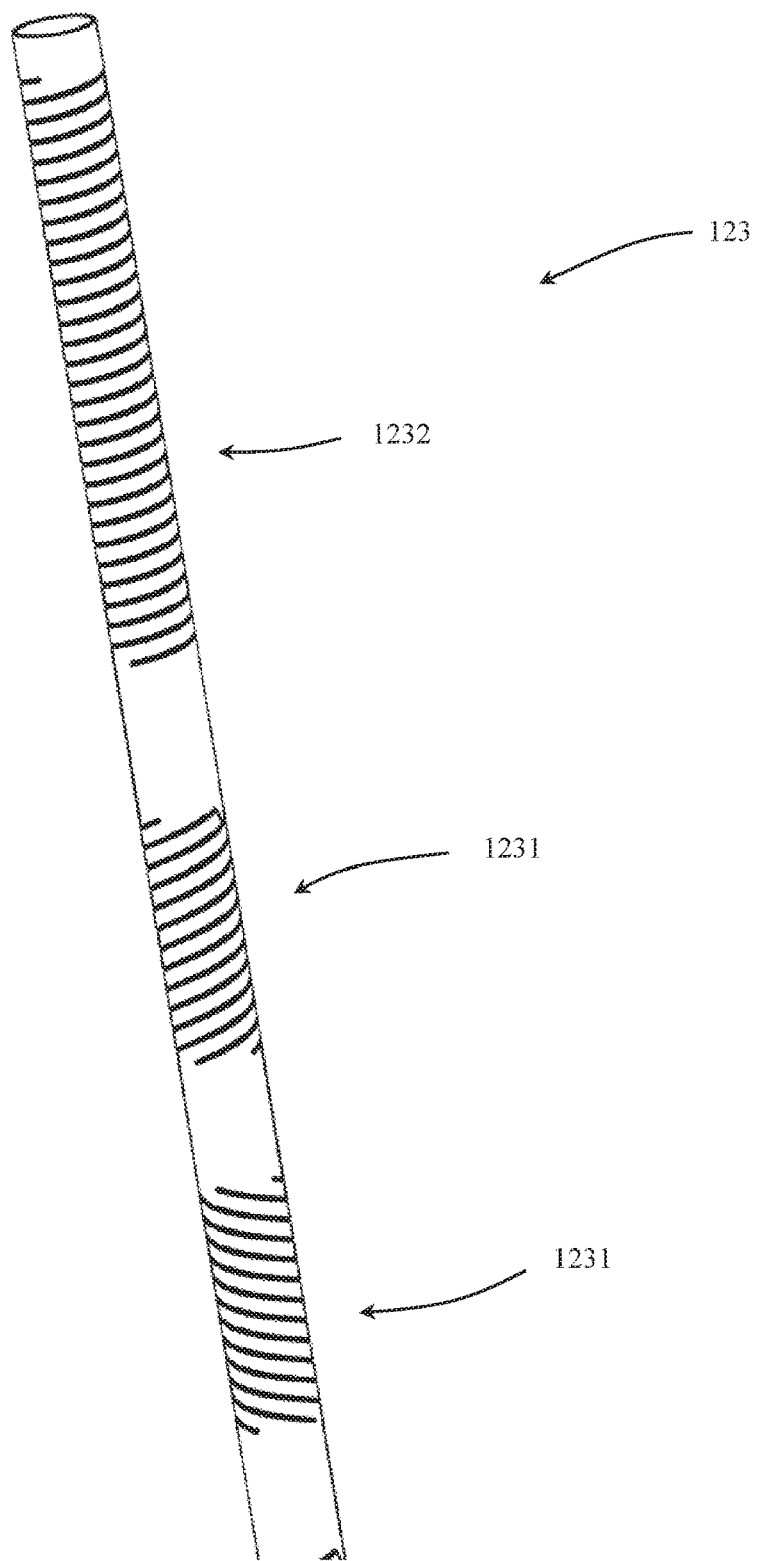
FIG. 5C schematically shows an enlarged section of a partition of the surgical device.

Attention is drawn to FIG. 5C schematically illustrating an optional partition 123 that may be included in the surgical tool in between actuator 122 and inner tool 124. Such partition 123 may be useful in providing a buffer between actuator 122 and e.g. its moving rods, and inner tool 124 that may be controlled to rotate when the surgical tool 12 performs a cutting action.

Partition 123 may include axially spaced apart flexible regions 1231 in this example formed as helical cuts through the partition. At least some of the flexible regions 1231 may be formed having opposing right-hand and left-hand helical paths to assist in resisting twisting of the partition about axis L during use. Possibly, flexible regions 1231 of the partition may be axially aligned in the surgical tool with flexible regions 12131 of the outer shell—in order to impart overall flexibility to the surgical tool in these regions so that it can flex and assume changing curvatures while being urged through the spinal canal.

The partition may also include a distal flexible region 1232 in this example also formed as a helical cut through the partition. Flexible region 1232 may be arranged to be overlaid by the steerable region 1212 of the outer shell in the assembled surgical tool, thus also with the aim of providing overall flexibility to the surgical tool in this region.

This overall flexibility may be useful, as with the former discussed aligned flexible regions 1231, 12131, in allowing the surgical tool to adjust in these regions to curvatures through which the tool may advance in the spinal canal. In addition, the flexibility imparted by flexible region 1232 may assist in permitting movements at the steerable region 1212, which may be controlled by the actuator 122.

Figure 5D:
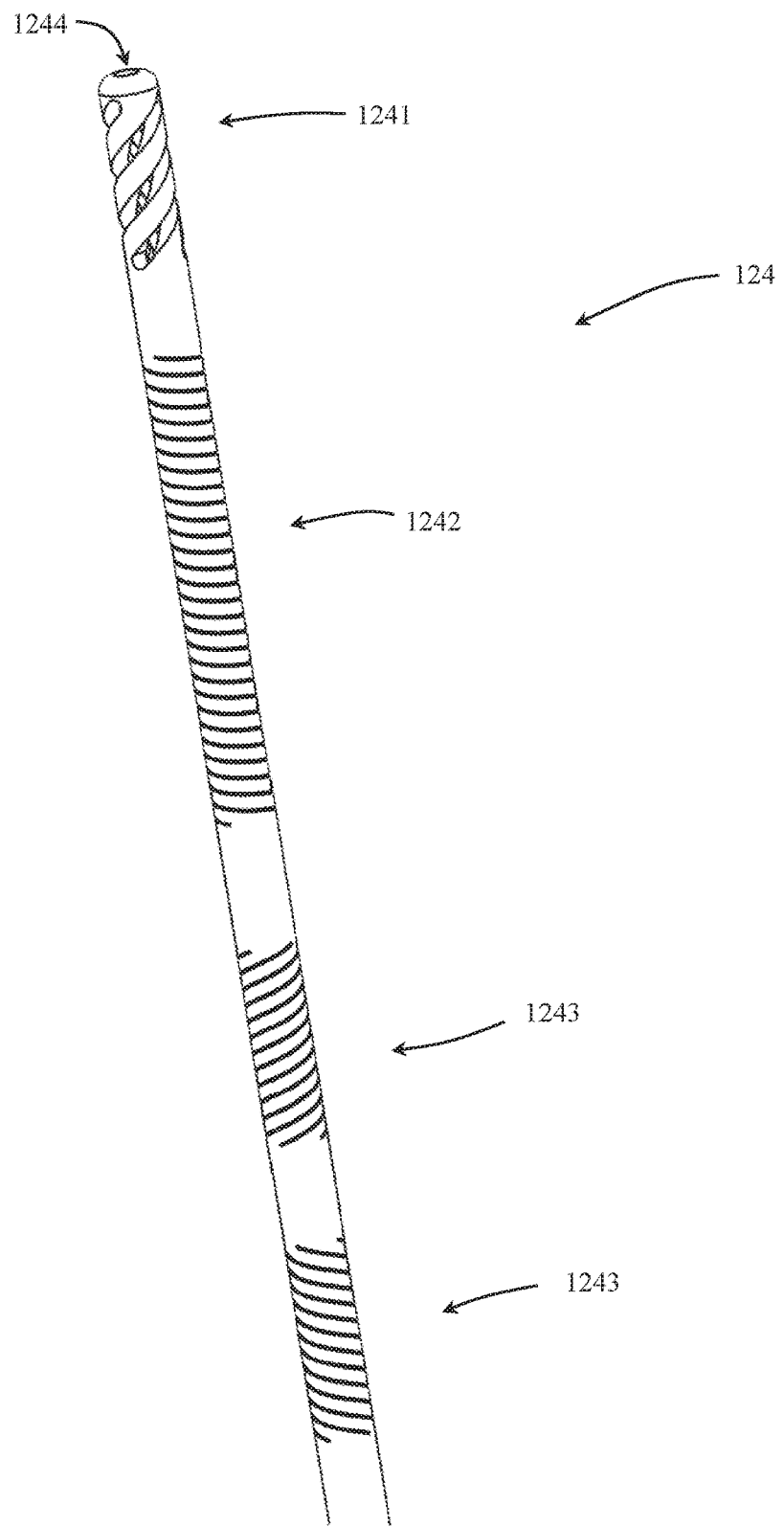
FIG. 5D schematically shows an enlarged section of an inner tool of the surgical device.

Attention is drawn to FIG. 5D schematically illustrating the inner tool 124 that includes an axially extending through going passage 1244. Inner tool includes cutting blade(s) 1241 formed at its distal end. The cutting blades 1241 are here shown being formed generally along a helical route, however any cutting blade formation suitable for cutting intended tissue, e.g. along the spine, may be applicable.

In addition the inner tool includes a flexible region 1242 proximal to the cutting blades 1241, which in this example may be formed as a helical cut through the inner tool. The flexible region 1242 may be arranged to be aligned and overlaid by the flexible region 1232 of the possible partition, and by the steerable region 1212 of the outer shell. And thus, the inner tool's flexible region 1242 assists in imparting overall flexibility in this region of the surgical tool.

The inner tool in this example may also include spaced apart flexible regions 1243 here also possibly formed as helical cuts through the partition. At least some of the flexible regions 1243 may be formed having opposing right-hand and left-hand helical paths to assist in resisting twisting of the inner tool about axis L during use. Possibly, the flexible regions 1243 of the inner tool may be axially aligned in the surgical tool with flexible regions 1231 of the partition and with flexible regions 12131 of the outer shell—in order to impart overall flexibility to the surgical tool in these region so that it can flex and assume changing curvatures while passing through the spinal canal.

It is noted that at least some axially aligned helical cuts forming flexible regions in different tool parts (e.g. 12131 in outer shell, 1231 in partition, 1243 in inner tool)—may possibly be formed having opposing right-hand and left-hand helical paths, in order to further assist in resisting twisting of the surgical tool about axis L during use.

Figure 6A:
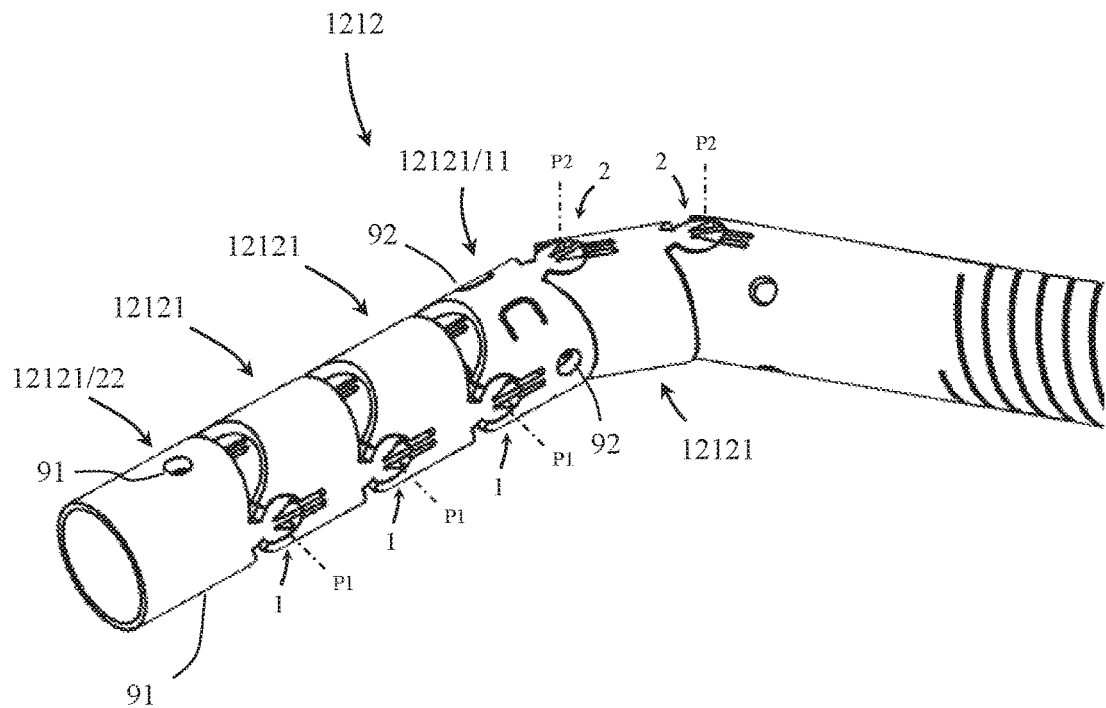
FIGS. 6A and 6B schematically show a distal region of the outer shell assuming various curvatures.
Figure 6B:
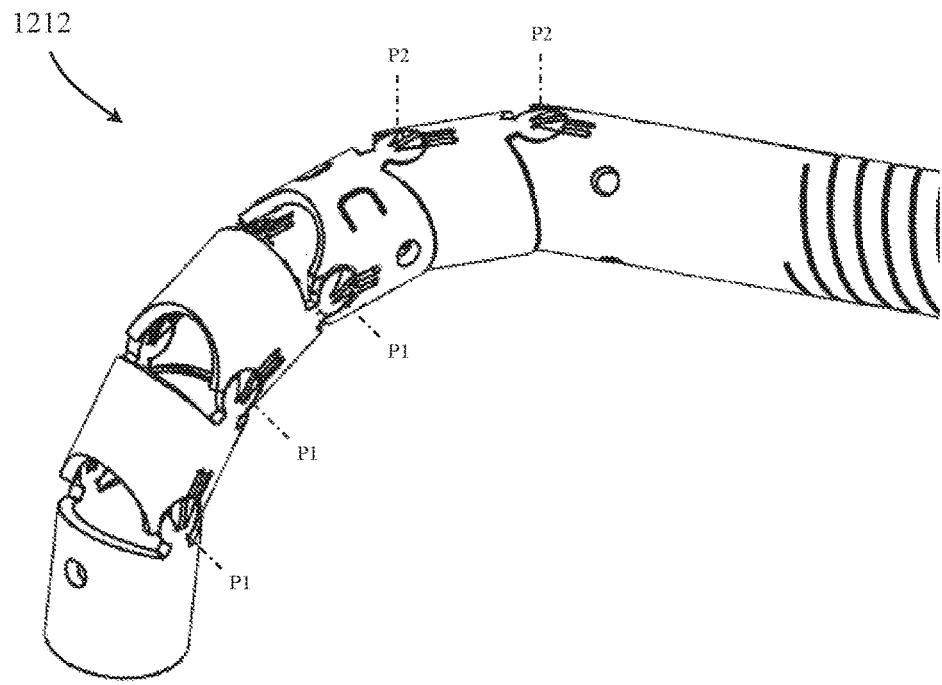

Attention is drawn to FIGS. 6A and 6B illustrating the steerable region 1212 of the outer shell in various possible steered states; while also drawing attention back to FIG. 5B to explain possible actuation of these steered states by actuator 122.

Actuator 122 in this example may be connected to the steerable region 1212 of the outer shell at two zones. One of the zones may be defined at the distal most hinge 12121 that is hinged in place by a hinge joint 1, where said distal hinge will be referred to from hereon also as an "actuated" hinge 11. The other zone may be defined at the distal most hinge 12121 that is hinged in place by a hinge joint 2, where said distal hinge will be referred to from hereon also as an "actuated" hinge 22.

The "actuated" hinge 11 may be arranged to include opposing ports 91, and may be designed at its inner side to attach at each port 91 to a respective one of the anchoring regions 1217 of the actuator. The "actuated" hinge 22 may be arranged to include opposing ports 92, and may be designed at its inner side to attach at each port 92 to a respective of the anchoring regions 1216 of the actuator. The ports 91 on "actuated" hinge 11 are rotated by about 90 degrees relative to the ports 92 "actuated" hinge 22, when the steerable region 1212 of the actuator is held straight.

By pulling and respectively pushing the first pair of rod members 1221 (as indicated e.g. by the 'dotted' arrows at the upper right-hand side of FIG. 5B), the rod members 1221 can be manipulated by a surgeon to urge the anchoring regions 1216 (that are fixed to "actuated" hinge 22) to rotate/pivot/twist generally about an axis P2' (P2 prime). This in turn urges the "actuated" hinge 22 that is connected to the anchoring regions 1216 to also rotate about axis P2 of the hinge joints 7 linking it to the joint 12121 that is proximal thereto. This bending within the steerable region 1212 that is urged by the rod members 1221, can occur at all the hinge joints 2 proximal to the "actuated" hinge 22.

By pulling and respectively pushing the second pair of rod members 1222 (as indicated e.g. by the 'dashed' arrows at the upper left-hand side of FIG. 5B), the rod members 1222 can be manipulated by a surgeon to urge the anchoring regions 1217 (that are fixed to "actuated" hinge 11) to rotate/pivot/twist generally about an axis P1' (P1 prime). This in turn urges the "actuated" hinge 11 that is connected to the anchoring regions 1217 to also rotate about axis P1 of the hinge joints 1 linking it to the joint 12121 that is proximal thereto. This bending within the steerable region 1212 that is urged by the rod members 1222, can occur at all the hinge joints 1 proximal to the "actuated" hinge 11.

In FIG. 6A, the joints 12121 hinged by hinge joints 2 were controlled by the rod members 1221 of actuator 122 to fully pivot about their receptive axes P2. This may amount to about a 60 degree bending of the outer shell in this region assuming angle 'α' is about 30 degrees (while accordingly other bending values may be assumed e.g. by designing angle 'α' to have a different value).

In FIG. 6B, the joints 12121 hinged by hinge joints 1 were further controlled by the rod members 1222 of the actuator 122 to fully pivot about their receptive axes P1. This may amount to about a 90 degree bending of the outer shell in this region assuming angle 'α' is about 30 degrees (while accordingly other bending values may be assumed e.g. by designing angle 'α' to have a different value).

While performing a cutting action with the surgical tool, debris being cut away e.g. ligaments within the spinal canal may be flushed out of the tool. This may be performed e.g. by applying suction at the through going passage 1244 of the inner tool. In addition or alternatively, fluid being urged downstream in the distal direction may be used to flush debris back upstream out of the surgical tool via the passage 1244.

An aspect of the present invention may be defined as provision of a tracking ability of invasive surgical tools located within a human body. Devices performing such tacking may be external to the human body and arranged to remotely sense a location of at least a portion of a surgical tool advancing within an area of the body. This aspect can be considered as an independent inventive aspect not necessarily linked to the described surgical tool embodiments disclosed herein and to their intended therapeutic purpose. For example, tracking as disclosed herein may be used for tracking an endoscope within an intestine, a sinus canal (or the like), a gastroscope within the oesophagus, stomach, duodenum (or the like), otorhinolaryngology (or the like).

Figure 7:
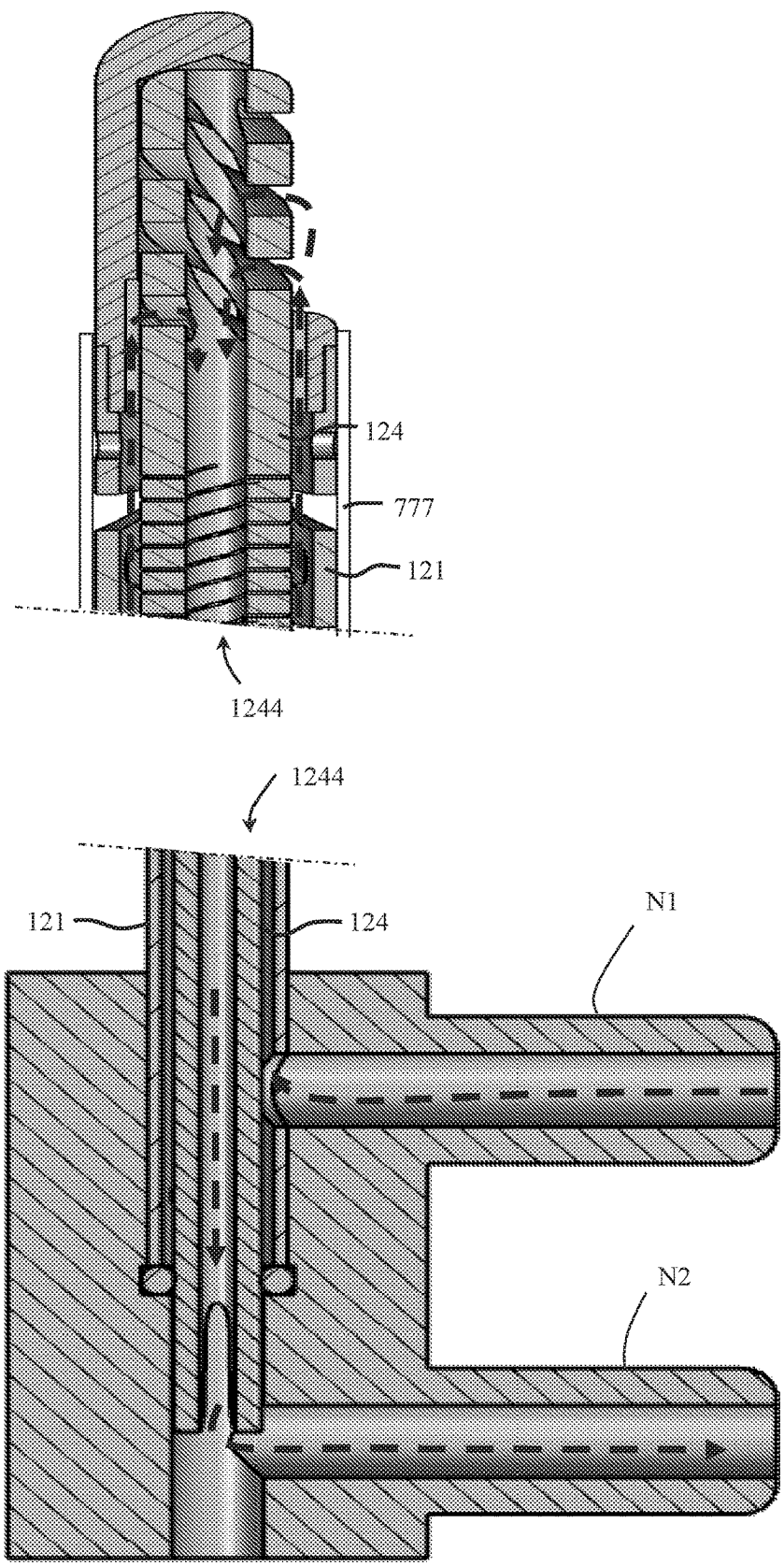
FIG. 7 schematically shows an embodiment of a debris clearing mechanism possibly used with an embodiment of a surgical device of the present invention.

Attention is drawn to FIG. 7 for a view of a possible mechanism for debris removal that may be implemented with respect to at least certain surgical device embodiments. The lower side of the figure illustrates a cross sectional view of a base member possibly similar to base member 13 illustrated in FIG. 2. This base member may include a first nozzle N1 that may be arranged for creating suction (possibly zero pressure or slightly below) within the through going passage 1244 passing through inner tool 124. This suction may be useful in removing out of the tool debris that may be formed during cutting operations of the surgical tool.

Possibly, an optional second nozzle N2 may be formed in the base member for inputting an incoming flow of liquid (possibly at or slightly above atmospheric pressure) that may be channeled to flow in the distal direction within a gap formed between inner tool 124 and outer shell 121. The incoming flow of liquid in one example may be saline. Possibly the outer shell may be coated at its periphery by an outer thin tubing 777 such as a PET heat shrink tubing (or the like). Tubing 777 may be useful in channeling most of the liquid entering via nozzle N2 towards the distal region of the surgical tool where at least some of this liquid may enter through the cutting blades of the inner tool and flow back (e.g. due to applied suction at the nozzle N1) in the proximal direction through passage 1244 to assist in removal of debris.

Figure 8:
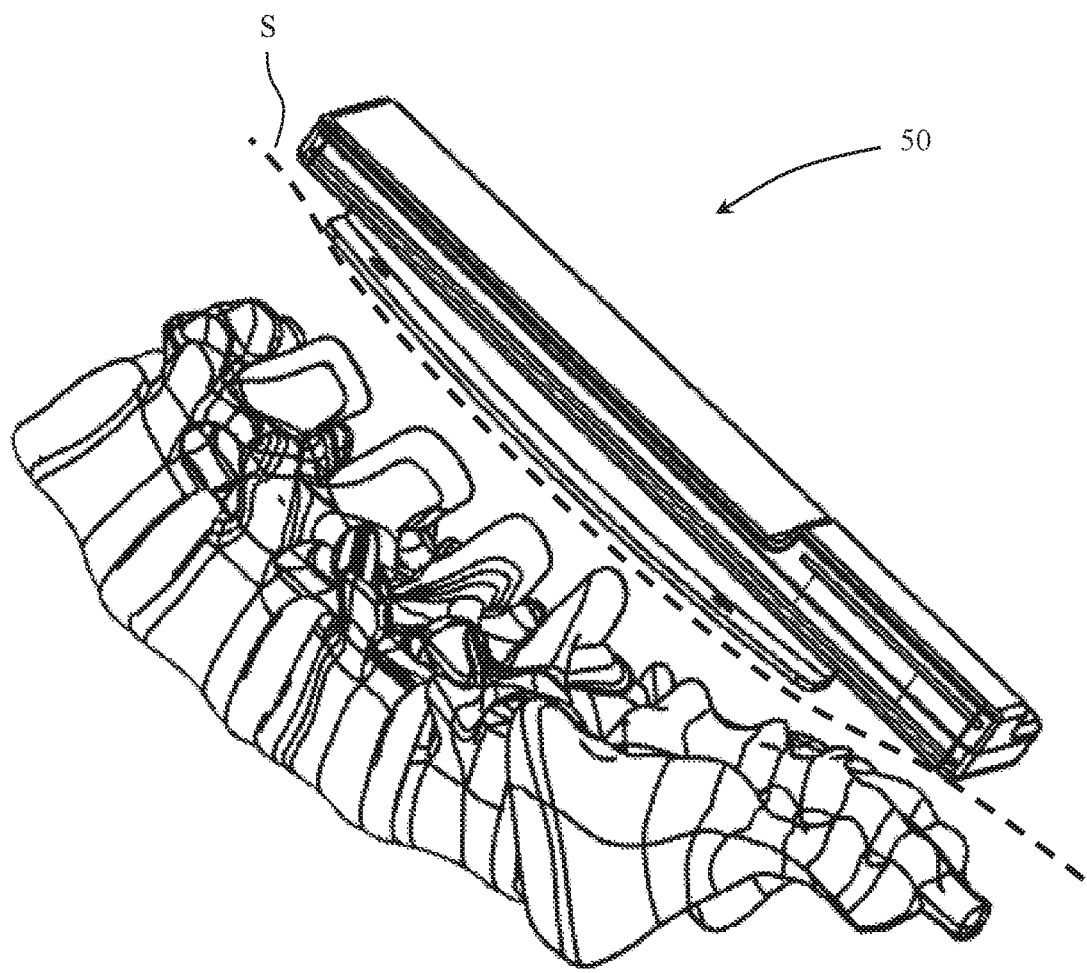
FIG. 8 schematically shows a lumbar curve of a human spine and a tracking device according to an embodiment of the present invention.

Attention is drawn to FIG. 8 illustrating a curve of a lumbar human spine and a tracking device 50 according to an embodiment of the present invention. Tracking device 50 may be placed outside of the human body, here fitted to a skin region (here marked by dashed line S) of a patient adjacent to his lumbar curve.

Figure 9A:
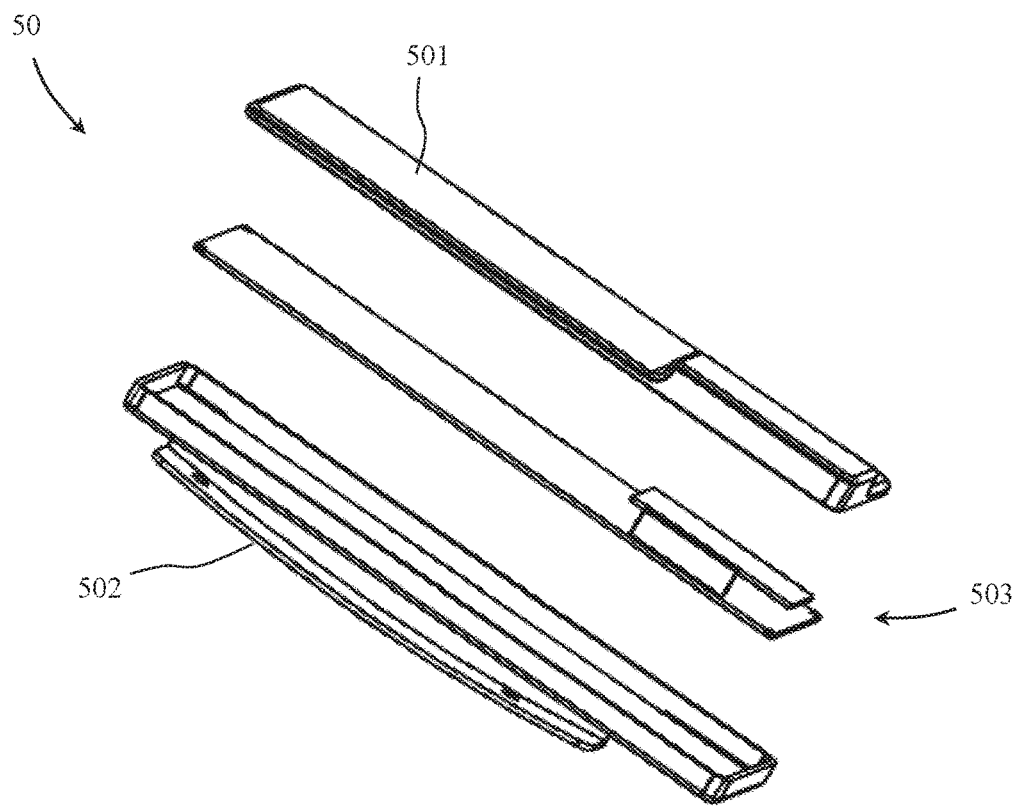
FIGS. 9A and 9B schematically show an exploded view of the tracking device and an embodiment of a sensor of the tracking device.

Attention is drawn to FIG. 9A demonstrating that the tracking device 50 may include an outer casing 501, 502 and a sensor plate 503 located within the casing. In this example, casing 502 arranged to contact the patient's skin S may be lid fitted to the skin e.g. by adhesive tape (or the like) in order to substantially fix tracking device 50 to the patient while tracking takes place.

Figure 9B:
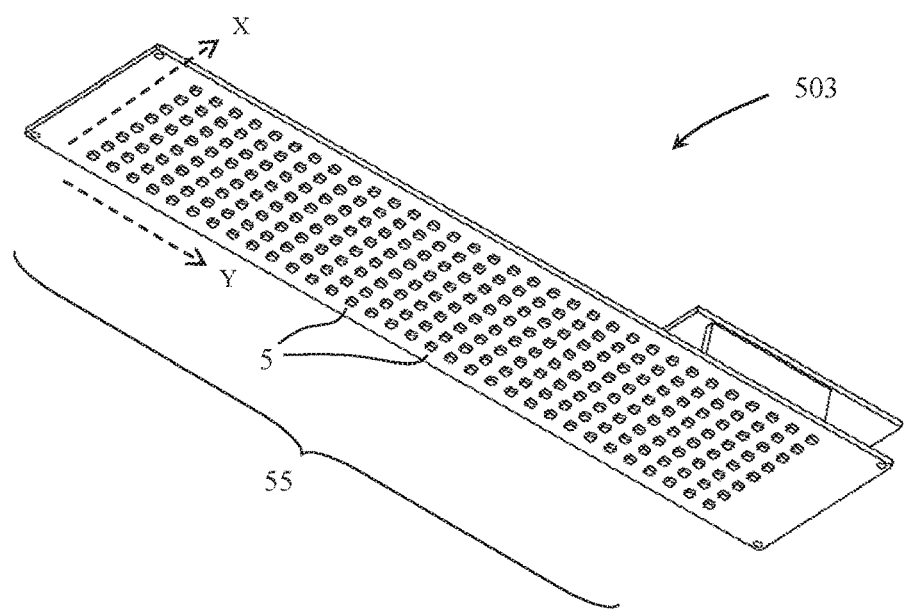

Attention is drawn to FIG. 9B for a closer view of a lower side of sensor plate 503. Sensor plate 503 as here seen may be fitted with an array 55 of magnetic sensors 5 arranged in a matrix of rows (extending alongside axis X) and columns (extending alongside axis Y).

Each sensor may be arranged to detect changes and disturbances in a magnetic field like flux, strength, direction (or the like). A controller receiving sensed signals from the sensors may be suitably programmed to detect X, Y coordinates of an object being tracked. Such coordinates may be determined e.g. by one or more sensor whose sensed signal(s) are maximal.

Figure 10:
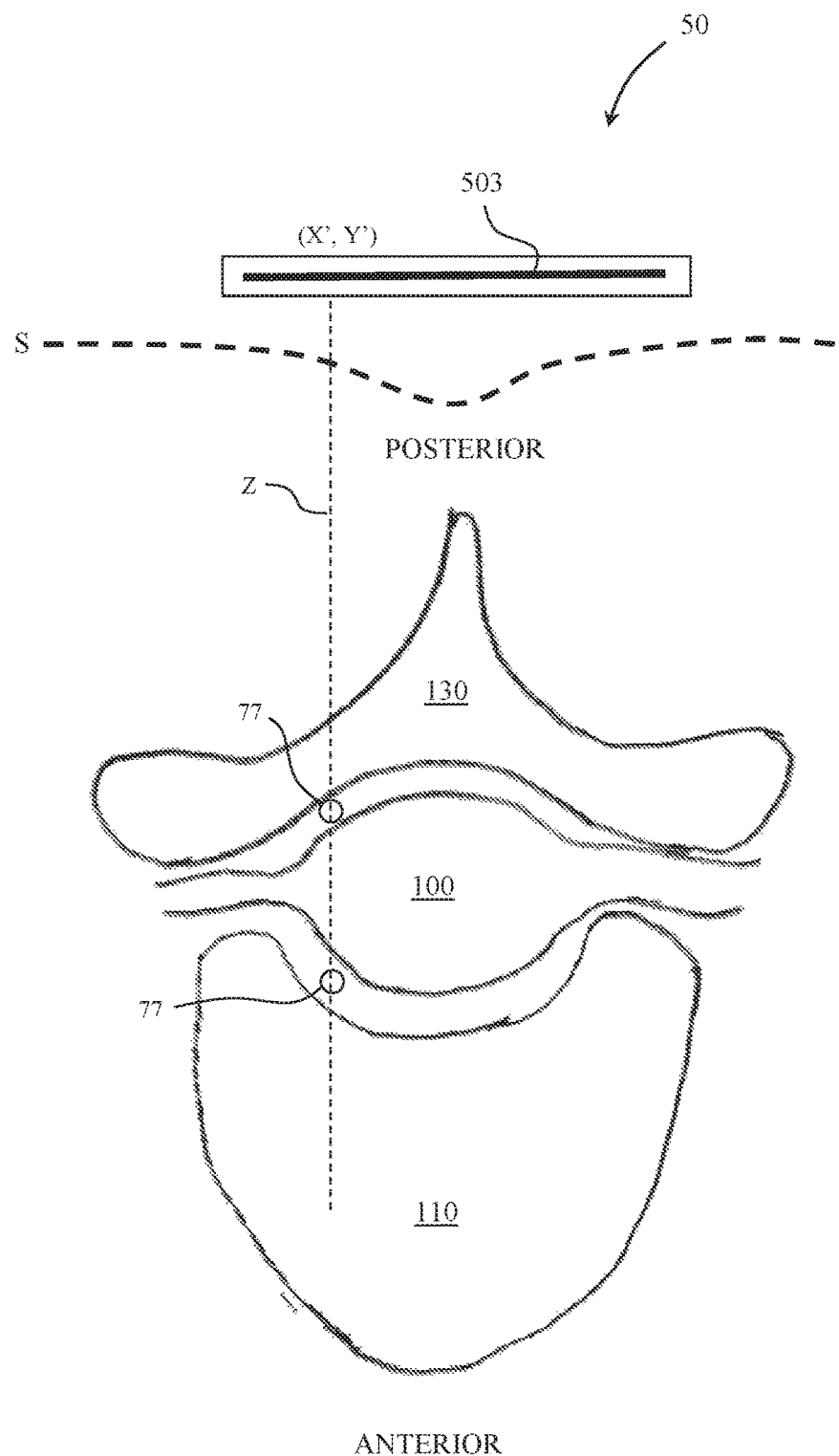
FIG. 10 schematically shows a cross section of a human spine revealing the thecal sac, and possible use of a tracking device for tracking a surgical tool within either a posterior or anterior side of the thecal sac.

Attention is drawn to FIG. 10 schematically showing a cross section of a human spine revealing e.g. vertebral bodies or intervertebral discs 110 anterior to the thecal sac 100 and e.g. laminae and ligamentum flavum 120 posterior to the thecal sac 100. A tracking device 50 including a sensor plate 503 such as that shown in FIG. 9B may be arranged to track here X', Y' coordinates of an invasive surgical tool advancing along the spinal cord.

In an aspect of the present invention, determining a location of the tracked invasive surgical tool along the Z axis in a direction towards the anatomy where the invasive surgical tool is located may be assisted by transforming the X', Y' coordinates of the tracked tool onto a 3D model of the anatomy being treated. Such a computerized three dimensional (3D) model of e.g. the epidural space may be reconstructed from data obtained from e.g. CT or NMI examination of the patient (or the like).

Once mapping and aligning the X', Y' coordinates of the detected invasive tool onto a reconstructed 3D model of the treated anatomy; a surgeon may be provided with suggestions/options along axis Z where the tracked tool may be present. In FIG. 10, such suggestions/options are marked by numeral 77 here as possible locations of the surgical tool, either within an anterior spacing between e.g. a vertebral body and the thecal sac—or e.g. within a posterior spacing between e.g. ligamentum flavum and the thecal sac.

Since the surgeon is aware of the route along which he chose to advance the surgical tool along the spinal canal, i.e. a route anterior or posterior to the thecal sac—the correct location along the Z axis may be confirmed.

When using a tracking device 50 with an embodiment of the a surgical tool according to the present invention, the object being tracked may optionally be shield 1211 that may of or arranged to include magnetic material that can be picked up by the magnetic sensors 5 of array 55. It is noted however that other and/or additional elements of a surgical tool according to an embodiment of the present invention may be designed to be made of or include magnetic material in order to be detected by tracking device 50.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology; and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity; it should be understood that various alterations and modifications could be made without departing from the scope of the invention as hereinafter claimed.

The invention claimed is:

1. A surgical tool for removing tissue at its axial distal end from a body organ, the surgical tool comprising:
   an axially extending outer shell having a plurality of axially spaced apart flexible regions formed each as a helical cut through the outer shell, and
   a rotatable inner tool extending within the outer shell and comprising a cutting edge at its distal end and a plurality of axially spaced apart flexible regions formed each as a helical cut through the inner tool,
   wherein flexible regions in the outer shell are generally axially aligned with flexible regions in the inner tool,
   wherein aligned flexible regions of the outer shell and the inner tool comprises opposing right-hand and left-hand helical paths, and
   at least one flexible region in the outer shell that is adjacent from another flexible region in the outer shell has opposing right-hand and left-hand helical paths and
   at least one flexible region in the inner tool that is adjacent from another flexible region in the inner tool has opposing right-hand and left-hand helical paths, wherein helical cuts through the inner tool and outer shell are continuous, wherein the outer shell has adjacent its distal end a steerable region arranged to be flexed and extended about at least two generally orthogonal first and second axes, wherein the steerable region of the outer shell comprises a plurality of joints, interconnected by pairs of hinge joints, wherein at least one of the pairs of hinge joints is arranges to flex and extend adjacent joints it interconnects about a first axis and at least one other pair of hinge joints is arranged to flex and extend adjacent joints it interconnects about a second axis, wherein each one of the hinge joints comprises a bearing member positively engaged within a socket member, wherein the socket member being integral with a first one of the joints being interconnected, and wherein the bearing member being integral with a second one of the joints being interconnected while the bearing member remains integrally joined also to the first one of the joints via a flexible linking arm.

2. The surgical tool of claim 1, wherein the inner tool comprises a through going internal passage for removal of debris formed during cutting operations.

3. The surgical tool of claim 2 and comprising applying suction to the internal passage from a proximal side of the surgical tool in order to assist in debris removal.

4. The surgical tool of claim 3 and comprising providing an incoming flow of liquid from a proximal side of the tool that is channeled to flow substantially between the inner tool and outer shell in the distal direction towards the inner tool's cutting edge in order to assist in debris removal.

5. The surgical tool of claim 4 and comprising an outer tubing formed on an outer side of the outer shell, possibly a heat shrink tubing.

6. The surgical tool of claim 1, wherein the steerable region is being arranged to overlay at least one of the flexible regions in the inner tool.

7. The surgical tool of claim 6, wherein at least some of the flexible regions are arranged to flex to assume changing curvatures, e.g. while passing through a passage in a human body.

* * * * *